(12) United States Patent  (10) Patent No.: US 8,925,512 B2
Kitada et al.  (45) Date of Patent: Jan. 6, 2015

(54) SUPPORT STRUCTURE FOR WATER-COOLED INTERNAL COMBUSTION ENGINE

(71) Applicant: Honda Motor Co., Ltd., Minato-Ku, Tokyo (JP)

(72) Inventors: Yoshihiro Kitada, Niiza (JP); Akihiro Iida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 13/765,780

(22) Filed: Feb. 13, 2013

(65) Prior Publication Data

US 2013/0220244 A1 Aug. 29, 2013

(30) Foreign Application Priority Data

Feb. 29, 2012 (JP) ................................. 2012-042743

(51) Int. Cl.
*F01P 7/14* (2006.01)
*F02B 75/22* (2006.01)
*B60K 11/02* (2006.01)
*F01P 3/00* (2006.01)

(52) U.S. Cl.
CPC ............... *F01P 3/00* (2013.01); *F01P 2050/16* (2013.01); *B60K 11/02* (2013.01)
USPC ................. 123/195 R; 123/41.08; 123/193.5; 180/228; 180/229

(58) Field of Classification Search
CPC .............. B60K 5/04; B60K 5/12; B60K 5/00; B60K 5/1216; F01P 2050/16; F01P 2003/024; F01P 7/16; B62M 7/00
USPC ............ 123/41.01, 41.08–41.1, 193.1, 193.3, 123/193.5, 195 R; 180/228, 229
See application file for complete search history.

(56) References Cited

U.S. PATENT DOCUMENTS 6,199,516 B1 3/2001 Katayama

FOREIGN PATENT DOCUMENTS

DE 198 56 770 A1 6/1999
JP 2009-090881 A 4/2009
JP 2010-236484 A 10/2010

*Primary Examiner* — Noah Kamen
(74) *Attorney, Agent, or Firm* — Carrier Blackman & Associates, P.C.; Joseph P. Carrier; William D. Blackman

(57) ABSTRACT

A support structure for a water-cooled internal combustion engine supported by a body frame of a motorcycle 2 includes a cooling device that circulates cooling water through an inside and an outside of at least a cylinder head of the engine, a thermo-valve that controls the cooling water circulating in the cooling device, and a thermo-valve case that accommodates the thermo-valve and that is integrally molded with the cylinder head such that a part thereof bulges from a side surface of the cylinder head. A support portion formed on the cylinder head is fixed to the body frame and is integrally molded so as to stride between the cylinder head and the thermo-valve case, whereby the support portion is solidly formed and an area around a thermo-valve case can be reinforced by the support portion.

19 Claims, 6 Drawing Sheets

SUPPORT STRUCTURE FOR WATER-COOLED INTERNAL COMBUSTION ENGINE

CROSS-REFERENCE TO RELATED APPLICATIONS

The present invention claims priority under 35 USC 119 based on Japanese patent application No. 2009-176360, filed on Jul. 29, 2009. The entire subject matter of this priority document, including specification claims and drawings, is incorporated by reference herein.

BACKGROUND OF THE INVENTION

1. Technical Field

The present invention relates to a support structure that supports a water-cooled internal combustion engine, in which a thermo-valve case that accommodates a thermo-valve is provided on a cylinder head, on a body frame.

2. Background Art

A water-cooled internal combustion engine including a thermo-valve case that accommodates a thermo-valve is disclosed in JP-A No. 2010-236484 (FIGS. 2 through 4), for example. The thermo-valve case is integrally molded with a cylinder head such that a part of the rear end of the cylinder head protrudes outward.

However, in the case of the structure illustrated in JP-A No. 2010-236484, if the size of the thermo-valve is increased in order to improve the cooling performance along with an increase in the number of cylinders or an increase in the engine displacement, the size of the thermo-valve case accommodating the thermo-valve is increased, so that the protrusion from the cylinder head becomes greater. This might reduce the rigidity of the area around the thermo-valve case.

SUMMARY OF INVENTION

In view of the above-described background art, an object of the present invention is to provide a support structure for a water-cooled internal combustion engine in which a support portion that fixes the water-cooled internal combustion engine to a body frame is solidly formed and the area around a thermo-valve case can be reinforced by the support portion.

In order to address the above object, according to a first aspect of the present invention, there is provided a support structure for a water-cooled internal combustion engine configured to be supported by a body frame of a vehicle, the support structure including: a cooling device that circulates cooling water through an inside and an outside of at least a cylinder head of the water-cooled internal combustion engine; a thermo-valve that controls the cooling water circulating in the cooling device; and a thermo-valve case that accommodates the thermo-valve and that is integrally molded on the cylinder head such that a part thereof bulges from a side surface of the cylinder head, wherein a support portion formed on the cylinder head is fixed to the body frame and is integrally molded so as to extend between the cylinder head and the thermo-valve case.

According to a second aspect of the present invention, in the support structure for a water-cooled internal combustion engine according to the first aspect, the support portion includes a support boss portion which is configured to receive therein an internal combustion engine fastening member for fastening to the body frame, and a plurality of reinforcing ribs are formed so as to radially extend from the support boss portion toward the thermo-valve case and the cylinder head.

According to a third aspect of the present invention, in the support structure for a water-cooled internal combustion engine according to the second aspect, a width of each of the reinforcing ribs is set such that a center portion of the thermo-valve case and a center portion of the support boss portion are located on an extended line of the reinforcing rib.

According to a fourth aspect of the present invention, in the support structure for a water-cooled internal combustion engine according to the second or third aspect, the support portion includes a connecting wall that connects between two of the reinforcing ribs, the connecting wall connecting between the reinforcing ribs while extending from the thermo-valve case to the support boss portion.

According to a fifth aspect of the present invention, in the support structure for a water-cooled internal combustion engine according to any one of the second through fourth aspects, a thickness of the support portion in a vehicle width direction gradually increases from the support boss portion toward the cylinder head.

According to a sixth aspect of the present invention, in the support structure for a water-cooled internal combustion engine according to any one of the second through fifth aspects, a joint part through which the cooling water passes is provided on the cylinder head so as to be adjacent to the thermo-valve case at an inner side in the vehicle width direction, and an extending direction of the support boss portion of the support portion and an extending direction of the joint part are substantially orthogonal to each other in the side view.

According to a seventh aspect of the present invention, in the support structure for a water-cooled internal combustion engine according to any one of the first through sixth aspects, a female thread portion for fixing a lid member of the thermo-valve case with a lid fastening member is provided with the thermo-valve case at a position displaced from the support portion.

According to an eighth aspect of the present invention, in the support structure for a water-cooled internal combustion engine according to any one of the first through seventh aspects, the thermo-valve case is disposed at a side end of the cylinder head in the vehicle width direction while a transmission mechanism accommodating chamber that accommodates a driving force transmission mechanism of the valve gear provided in the cylinder head bulges from the cylinder head at another side end thereof so as to form a bulge portion, and another support portion is provided on the bulge portion.

Advantageous Effects of Invention

With the support structure for a water-cooled internal combustion engine according to the first aspect of the present invention, since the support portion connected from the thermo-valve case protruding from the cylinder head to the cylinder head therearound is formed integrally with the cylinder head, the support portion that fixes the water-cooled internal combustion engine to the body frame is solidly formed. Also, the area around the thermo-valve case can be reinforced by the support portion.

With the second aspect of the present invention, in addition to the advantageous effects according to the first aspect of the invention, the rigidity between the support boss portion into which the internal combustion engine fastening member is inserted and the cylinder head, as well as the rigidity between the support boss portion and the thermo-valve case, are increased so that the strength of the entire support portion is increased.

With the third aspect of the present invention, in addition to the advantageous effects according to the second aspect of the invention, since the width of the reinforcing rib is set such that the center portion of the thermo-valve case and the center portion of the support boss portion are located on the extended line of the reinforcing rib, the coupling rigidity of the reinforcing rib is further increased.

With the fourth aspect of the present invention, in addition to the advantageous effects according to the second or third aspect of the invention, since the connecting wall connects between two of the reinforcing ribs while extending from the thermo-valve case to the support boss portion in the support portion, the rigidity is further increased.

With the fifth aspect of the present invention, in addition to the advantageous effects of any one of the second through fourth aspects of the invention, since the thickness of the support portion in the vehicle width direction gradually increases toward the cylinder head, the rigidity at a base portion connected to the cylinder head is increased.

With the sixth aspect of the present invention, in addition to the advantageous effects of any one of the second through fifth aspects of the invention, since the extending directions of the support boss portion and the joint part are substantially orthogonal to each other, interference with components to be connected to the support boss portion and the joint part is reduced, so that the assembly efficiency is improved.

With the seventh aspect of the present invention, in addition to the advantageous effects of any one of the first through sixth aspects of the invention, since the support boss portion of the support portion into which the internal combustion engine fastening member is inserted and the female thread portion of the thermo-valve case for fastening the lid member are displaced from each other, it is possible to prevent interference between the internal combustion engine fastening member and the lid fastening member, and therefore to increase the efficiency of the assembly process.

With the eighth aspect of the present invention, in addition to the advantageous effects of any one of the first through seventh aspects of the invention, since the other support portion at the opposite side of the thermo-valve case in the vehicle width direction is provided on the bulge portion of the transmission mechanism accommodating chamber, the support portion and the other support portion opposing each other in the vehicle width direction on the cylinder head can be formed to have substantially the same length and shape. This makes it possible to support the internal combustion engine in a balanced manner while balancing the rigidity of each of the support boss portion of the support portion and another support boss portion of the other support portion.

For a more complete understanding of the present invention, the reader is referred to the following detailed description section of non-limiting, exemplary embodiments of the invention, which should be read in conjunction with the accompanying drawings. Throughout the following detailed description and in the drawings, like numbers refer to like parts.

DETAILED DESCRIPTION OF EXEMPLARY EMBODIMENTS

Figure 1:
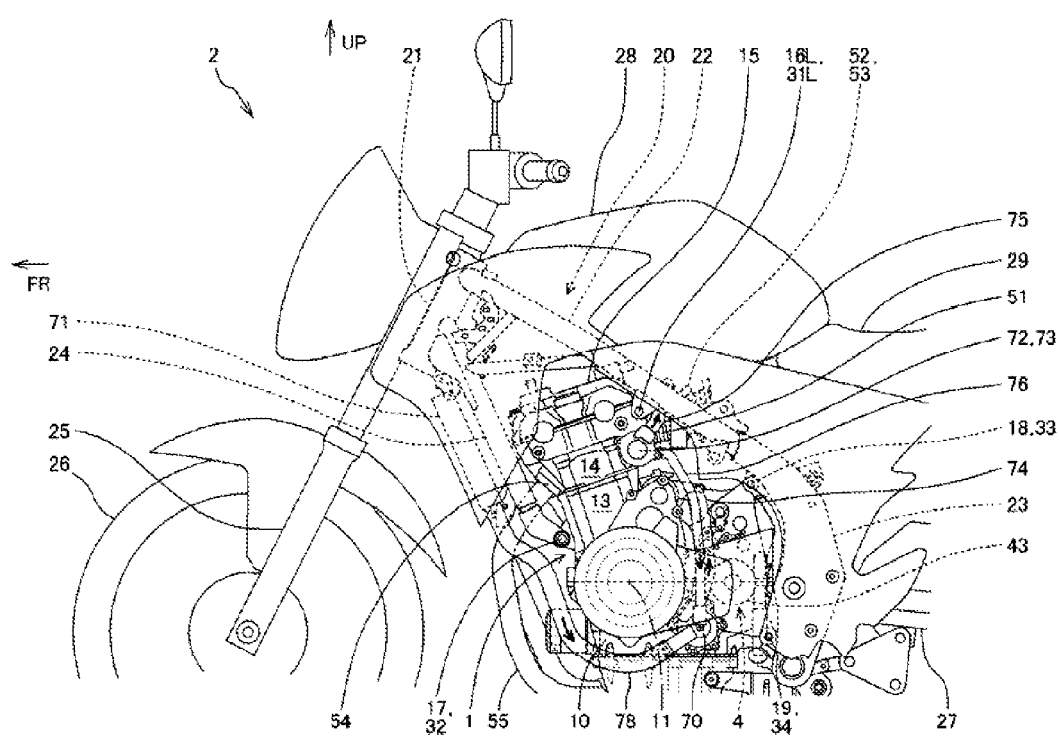
FIG. 1 is a left side view of a main part of a motorcycle equipped with a water-cooled internal combustion engine that includes a support structure for a water-cooled internal combustion engine according to an exemplary embodiment of the present invention.

A description will be given of a support structure for a water-cooled internal combustion engine according to an exemplary embodiment of the present invention with reference to FIGS. 1 through 6.

It is to be noted that the directions such as front and rear, right and left, and up and down mentioned in this specification and the appended claims correspond to the directions of a vehicle in which a water-cooled internal combustion engine 1 including the support structure for the water-cooled internal combustion engine according to the present embodiment is mounted. In the present embodiment, the vehicle is a small vehicle, and more specifically, is a motorcycle 2.

In the drawings, the arrow FR points toward the front side of the vehicle; the arrow LH points toward the left side of the vehicle; the arrow RH points toward the right side of the vehicle; and the arrow UP points toward the upper side of the vehicle. The small black arrows shown in the drawings schematically show the flow of cooling water in this embodiment for the purpose of reference.

FIGS. 1 through 6 illustrate an exemplary embodiment of the present invention. In FIG. 1, a water-cooled internal combustion engine (hereinafter simply referred to as an "internal combustion engine") 1 of this embodiment mounted on the motorcycle 2 is illustrated.

The internal combustion engine 1 according to this embodiment is a water-cooled two-cylinder four-stroke-cycle internal combustion engine in which a transmission 4 (see FIG. 2) is integrally provided at a rear portion of a crankcase 10 thereof so as to form a so-called power unit. The internal combustion engine 1 is mounted on the motorcycle 2 such that a crankshaft 11 is disposed in a vehicle width direction, i.e., the lateral direction, of the motorcycle 2.

As illustrated in FIG. 1, a body frame 20 constituting a vehicle of the motorcycle 2 equipped with the internal combustion engine 1 of this embodiment has a pair of left and right main frames 22 extending rearward from a head pipe 21, and rear ends thereof are connected to center frames 23. The center frames 23 slightly extend rearward, and then bend downward. A pair of left and right down frames 24 extend sharply obliquely downward from the head pipe 21 so as to be substantially parallel to the center frames 23 in the side view. Further, a seat rail not shown extends from upper portions of the center frames 23. A back stay not shown connecting a center portion of the seat rail to lower portions of the center frames 23 supports the seat rail. These components form the body frame 20.

In the body frame 20 described above, a front fork 25 is pivotally supported by the head pipe 21, and a front wheel 26 is journaled to a lower end thereof. Further, a rear fork 27 having a front end supported at lower portions of the center frames 23 extends rearward, and a rear wheel not shown is journaled to a rear end thereof. A rear cushion not shown is interposed between the rear fork 27 and the body frame 20. A fuel tank 28 is disposed on front portions of the main frames 22, and a seat 29 is supported by the seat rail not shown on the rear side of the fuel tank 28.

Figure 2:
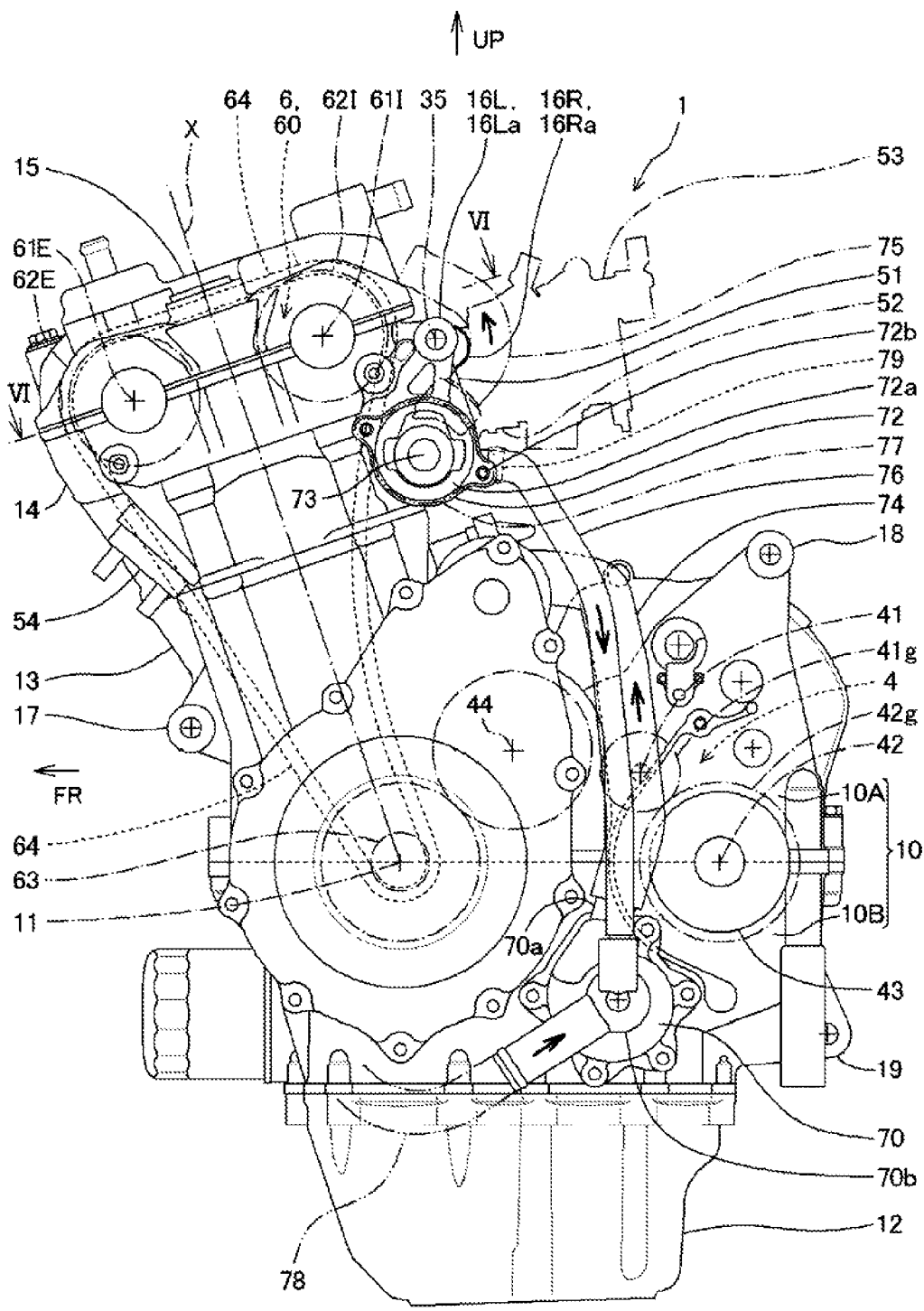
FIG. 2 is an external left-side view of the water-cooled internal combustion engine that includes the support structure for the water-cooled internal combustion engine according to the exemplary embodiment of the present invention.

As illustrated in FIG. 2, the internal combustion engine 1 is integrally formed with the transmission 4 as mentioned above. The crankcase 10 to which the crankshaft 11 is journaled includes an upper crankcase 10A and a lower crankcase 10B that are vertically separable from each other and are fastened and coupled to each other. An oil pan 12 is attached below the lower crankcase 10B. On the upper side of the crankshaft 11 of the crankcase 10 having the transmission 4 therein, cylinders 13 and a cylinder head 14 are disposed upright so as to be placed on one another with the cylinder axis X slightly inclined forward. Further, a cylinder head cover 15 is attached so as to cover the top of the cylinder head 14.

Figure 3:
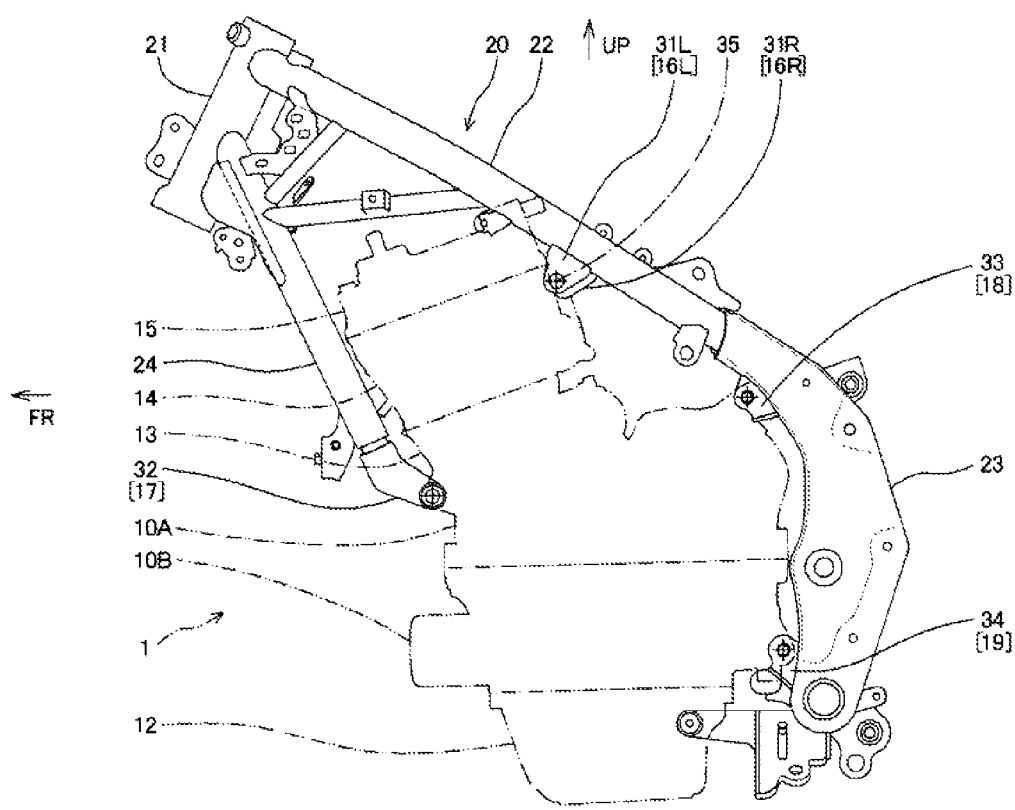
FIG. 3 is a left side view of a main part of a body frame of the motorcycle of FIG. 1.

FIG. 3 illustrates the head pipe 21, the main frames 22, the center frames 23, and the down frames 24 of the body frame 20. The internal combustion engine 1 is suspended by the main frames 22, the center frames 23, and the down frames 24. It is to be noted that, in FIG. 3, the mounted internal combustion engine 1 is indicated by the two-dotted lines, and the reference signs of the corresponding support portions of the internal combustion engine 1 are shown in parentheses for the purpose of reference.

More specifically, left and right upper support brackets 31L and 31R are provided on the main frames 22 such that left and right upper support portions 16L and 16R provided at rear portions of the cylinder head 14 of the internal combustion engine 1 are fastened and fixed thereto. Front support brackets 32 and 32 are provided at lower ends of the left and right down frames 24 such that left and right front support portions 17 and 17 provided at front portions of the upper crankcase 10A of the internal combustion engine 1 are fastened and fixed thereto. Rear support brackets 33 and 33 are provided at upper portions of the left and right center frames 23 such that left and right rear support portions 18 and 18 provided at rear portions of the upper crankcase 10A of the internal combustion engine 1 are fastened and fixed thereto. Lower support brackets 34 and 34 are provided at rear portions of the left and right center frames 23 such that left and right lower support portions 19 and 19 provided at rear portions of the lower crankcase 10B of the internal combustion engine 1 are fastened and fixed thereto.

As illustrated in FIG. 2, an intake pipe 52 connected to an intake port 51 extends rearward from the cylinder head 14 of the internal combustion engine 1 so as to reach an air cleaner not shown through a throttle body 53. An exhaust pipe 55 connected to an exhaust port 54 extends forward from the cylinder head 14, and bends downward so as to extend rearward under the internal combustion engine 1, and reaches a muffler not shown.

The two cylinders 13 having cylinder bores are integrally formed in the upper crankcase 10A of the internal combustion engine 1, and the cylinder head 14 is overlapped therewith. The cylinder head 14 and the upper crankcase 10A forming the cylinders 13 are integrally fastened to each other with fastening bolts 58 (see FIG. 6). A piston not shown is reciprocally and slidably fitted in the cylinder 13, and the crankshaft 11 is rotatively driven when the internal combustion engine 1 is operated.

A valve chamber 60 is formed between the cylinder head 14 and the cylinder head cover 15. A valve gear 6 including an intake valve camshaft 61I and exhaust valve camshaft 61E for opening and closing intake and exhaust valves not shown which open and close the intake and exhaust ports 51 and 54, respectively, driven cam chain sprockets 62I and 62E, and intake and exhaust rocker arms not shown. A cam chain 64 is wound around the driven cam chain sprockets 62I and 62E and a drive cam chain sprocket 63 attached to the crankshaft 11. The cam chain 64 rotatively driven the intake valve camshaft 61I and the exhaust valve camshaft 61E at half the speed of the crankshaft 11 and thereby swings intake and exhaust rocker arms not shown so as to open and close the intake and exhaust valves at necessary timings, respectively. Therefore, a cam chain chamber 65 through which the cam chain 64 is inserted is formed so as communicate with the right sides of the cylinder head 14 and the cylinder 13 and communicate with the crankcase 10.

At a rear portion of the crankcase 10, a main shaft 41 and a countershaft 42 of the transmission 4 oriented in the lateral direction are rotatably disposed in parallel to each other behind the crankshaft 11. A main gear group 41g journaled to the main shaft 41 and a counter gear group 42g journaled to the countershaft 42 constantly engage with each other, thereby realizing the transmission 4. It is to be noted that reference sign 44 in FIG. 2 denotes a balancer shaft.

The rotation of the crankshaft 11 is transmitted to the main shaft 41 through a clutch not shown, and thus the countershaft 42 is rotatively driven at a speed that has been changed by the gear shift of the transmission 4. The countershaft 42 passes through the left side of the crankcase 10 to project outward so as to be the last output shaft 42 of the internal combustion engine 1. An output sprocket 43 is fitted by splines to the projecting portion. A drive chain not shown wound around the output sprocket 43 is stretched to a driven sprocket at the rear wheel side so as to transmit the power to the rear wheel.

The internal combustion engine 1 of this embodiment is a water-cooled type, and a water pump 70 is provided on a rear portion of a left wall of the lower crankcase 10B. A radiator 71 is disposed in front of the internal combustion engine 1 (see FIG. 1), and a thermo-valve case 72 is located at the rear left side of the cylinder head 14 and is integrally molded such that a part thereof bulges from a rear left surface 14a and a rear surface 14b of the cylinder head. The thermo-valve case 72 has a cylindrical accommodating space whose axial direction is parallel to the crankshaft 11, and the thermo-valve 73 is disposed therein.

A pump discharge pipe 74 connected to a discharge port 70a of the water pump 70 extends to the rear of the cylinder 13 so as to be connected to the cylinder rear portion, and communicates with a water jacket not shown such that cooling water is sent into the water jacket. The water jacket is formed inside a wall of the cylinder 13 and inside a wall of the cylinder head 14 so as to communicate therewith. At the rear of the cylinder head 14, the water jacket communicates with the thermo-valve case 72. Thus, the cooling water having flowed into the thermo-valve case 72 from the water jacket is controlled by the thermo-valve 73 so as to flow out to a coupling pipe 75 or a bypass pipe 76.

The coupling pipe 75 has an upstream end that is connected to a thermo-valve cap 77 attached to a left-end opening 72a of the thermo-valve case 72 so as to communicate with the inside thereof, and has a downstream end not shown that is connected to and communicates with the radiator 71 (see FIG. 1) disposed in front of the internal combustion engine 1. A return pipe 78 having an upstream end connected to the radiator 71 extends rearward along a lower left surface of the internal combustion engine 1, and a downstream end thereof is connected to a suction opening 70b of the water pump 70.

Figure 4:
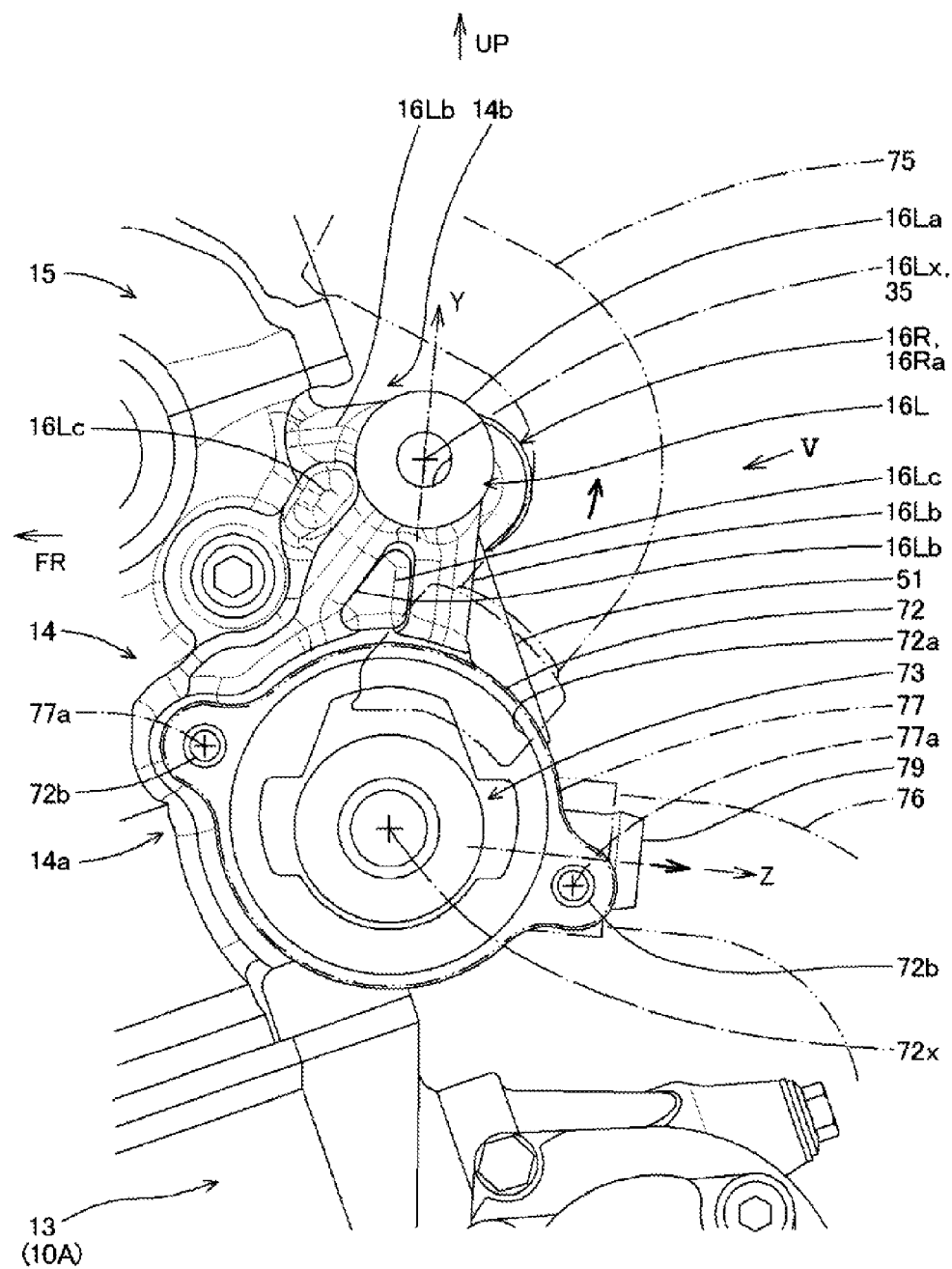
FIG. 4 is an enlarged view of a rear left surface of a cylinder head of FIG. 2.
Figure 5:
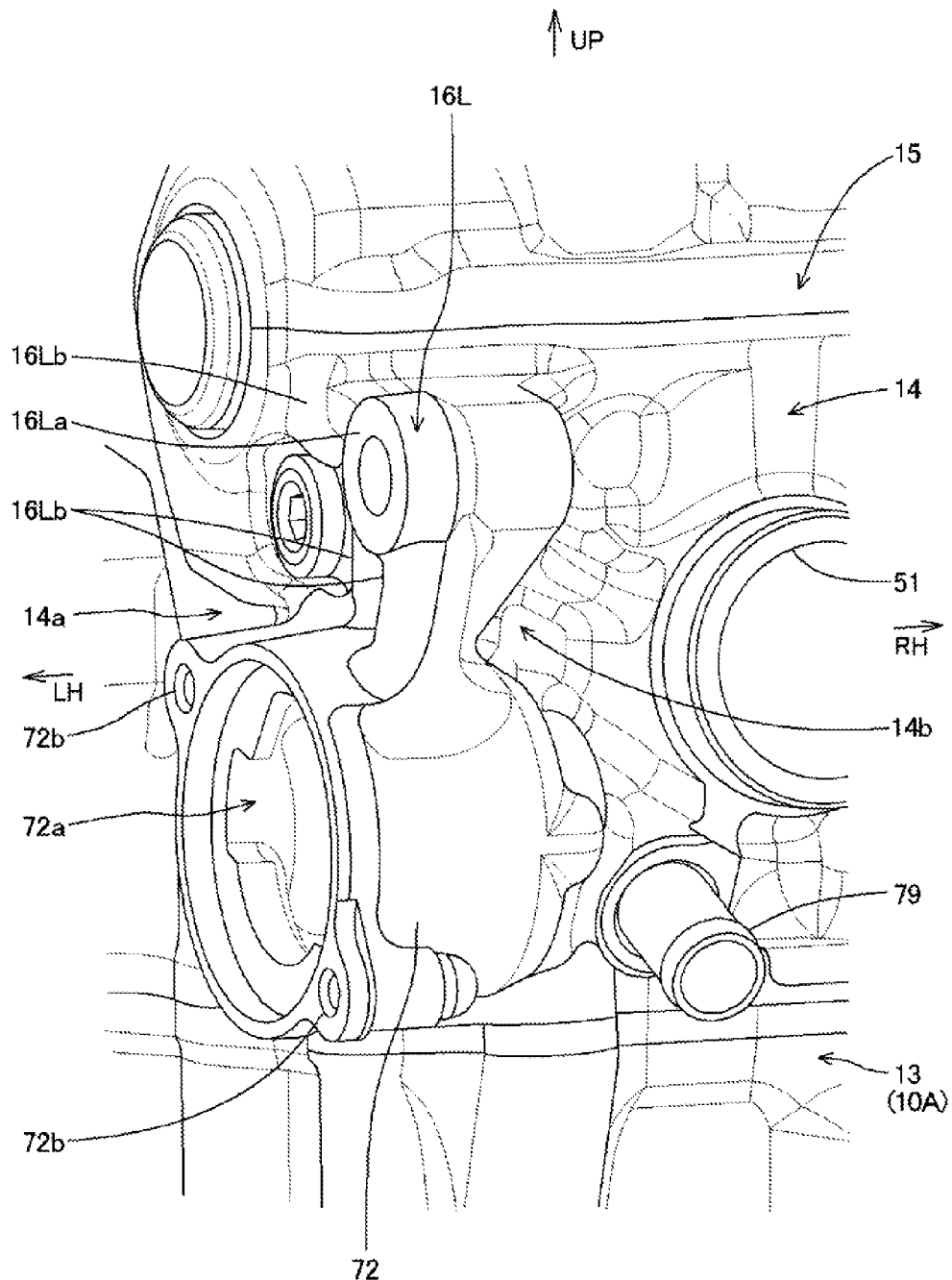
FIG. 5 is a perspective view of a rear left portion of the cylinder head as viewed from arrow V of FIG. 4.
Figure 6:
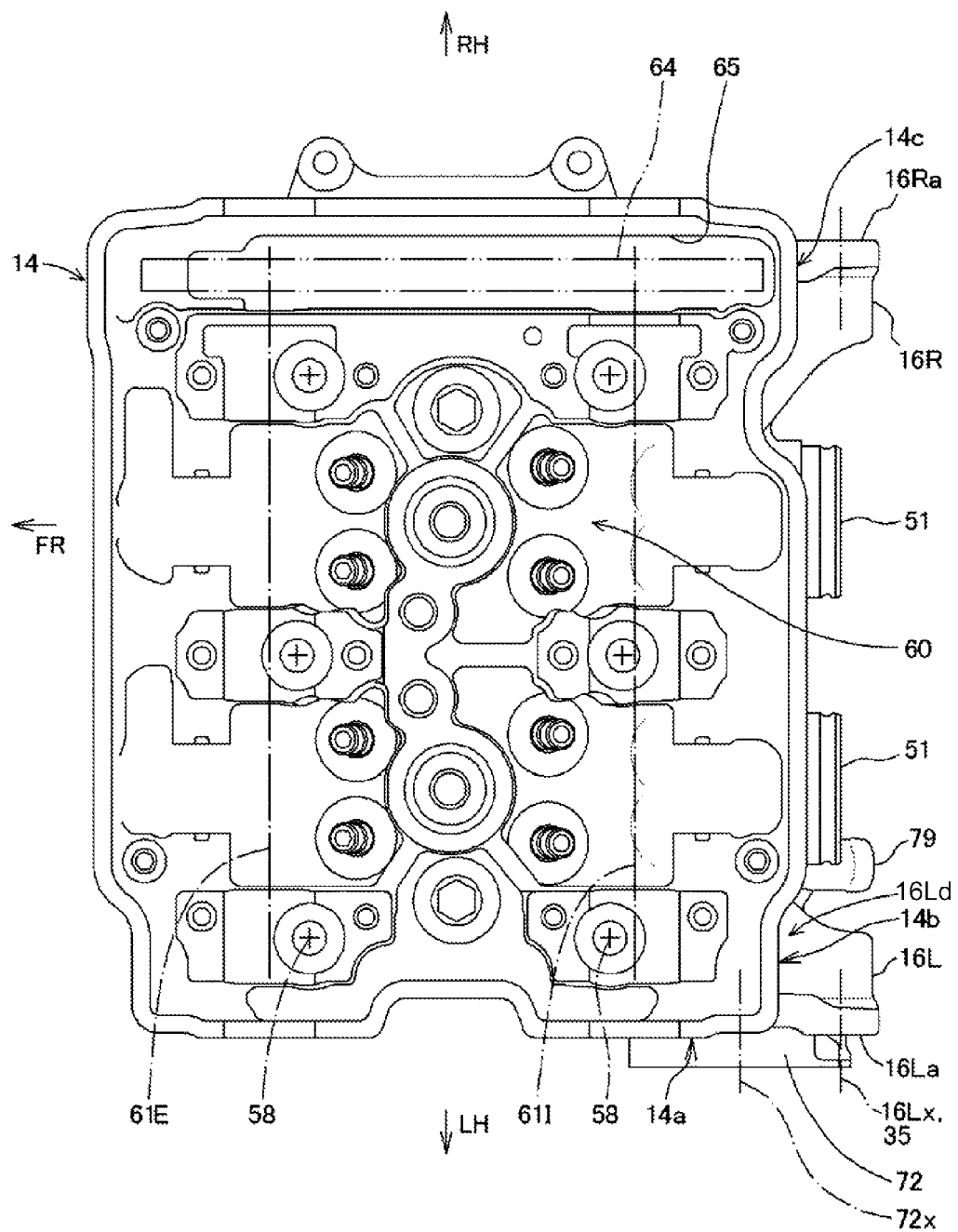
FIG. 6 is a plan view of the cylinder head taken along line VI-VI of FIG. 2 in which a valve gear is removed.

Further, as illustrated in FIGS. 4, 5, and 6, a bypass connecting pipe 79 projecting rearward is provided adjacent to the thermo-valve case 72 at the inner side in a vehicle width direction. The bypass pipe 76 having an upstream end connected to the bypass connecting pipe 79 extends downward from the rear of the cylinder 13 along the left surfaces of the upper crankcase 10A and the lower crankcase 10B, and a downstream end thereof is connected to the suction opening 70b of the water pump 70.

As described above, the water-cooling device of the internal combustion engine 1 of this embodiment includes the water pump 70, the water jacket, the thermo-valve 73, the radiator 71, and pipes and the like connecting therebetween. The cooling water discharged by driving the water pump 70 passes through the pump discharge pipe 74 to the water jacket inside the wall of the cylinder 13 and flows through the water jacket inside the walls of the cylinder 13 and the cylinder head 14 so as to cool the cylinder 13 and the cylinder head 14.

After that, the cooling water reaches the inside of the thermo-valve case 72, which is disposed at the rear left side of the cylinder head 14 and communicates with the water jacket inside the wall of the cylinder head 14. In the thermo-valve case 72, the thermo-valve 73 controls distribution and interruption of the cooling water into the radiator 71 in accordance with the warm-up state of the internal combustion engine 1.

That is, in the case where the temperature of the cooling water has not reached a predetermined temperature at the start-up or the like, the thermo-valve 73 blocks the distribution of the cooling water from the water jacket to the radiator 71 so as to cause the cooling water to flow toward the bypass connecting pipe 79. The cooling operation of the cooling water by the radiator 71 is suspended, and the cooling water passes through the bypass pipe 76 and is directly recirculated to the suction opening 70b of the water pump 70. On the other hand, in the case where the temperature of the cooling water has become equal to the predetermined temperature or higher, the thermo-valve 73 blocks the bypass connecting pipe 79 so as to cause the cooling water to flow toward the coupling pipe 75 connected to the thermo-valve cap 77. The cooling water is sent to the radiator 71 and cooled therein, and then the cooling water is recirculated to the suction opening 70b of the water pump 70 through the return pipe 78.

In this embodiment, the above-mentioned left upper support portion ("support portion" in the present invention) 16L that is fastened and fixed to the left upper support bracket 31L of the main frame 22 so as to support the internal combustion engine 1 is located at the rear left side of the cylinder hear 14. Similarly, the thermo-valve case 72 that is integrally molded on the rear of the cylinder head 14 such that a part thereof bulges from the rear left surface 14a and the rear surface 14b is disposed below and adjacent thereto. The left upper support portion 16L is integrally molded so as to stride between the cylinder head 14 and the thermo-valve case 72. The left upper support portion 16L formed on the cylinder head 14 in this manner is fixed to the main frame 22 of the body frame 20.

Accordingly, since the left upper support portion 16L connected from the thermo-valve case 72 bulging from the cylinder head 14 to the cylinder head therearound is formed integrally with the cylinder head 14, the left upper support portion 16L that fixes the internal combustion engine 1 to the body frame 20 is solidly formed. Further, since the area around the thermo-valve case 72 is reinforced by the left upper support portion 16L, even in the case where the capacity and the size of the thermo-valve 73 are increased and therefore the size of the thermo-valve case 72 is increased, it is possible to manage the strength of the thermo-valve case 72.

As shown in FIG. 4, the left upper support portion 16L of this embodiment includes a left support boss portion ("support boss portion" in the present invention) 16La into which an internal combustion engine fastening member 35 for fastening and fixing to the left upper support bracket 31L of the body frame 20 is to be inserted, and a plurality of reinforcing ribs 16Lb are formed so as to radially extend from the left support boss portion 16La toward the thermo-valve case 72 and the rear left surface of the cylinder head 14. With this configuration, the rigidity between the left support boss portion 16La into which the internal combustion engine fastening member 35 is inserted and the cylinder head 14 as well as the rigidity between the left support boss portion 16La and the thermo-valve case 72 are increased by the reinforcing ribs 16Lb, so that the strength of the entire left upper support portion 16L is increased.

Further, the width of each of the reinforcing ribs 16Lb is set such that a center portion 72x of the thermo-valve case 72 and a center portion 16Lx of the left support boss portion 16La are located on the extended lines of the reinforcing ribs 16Lb. Since the width of the reinforcing ribs 16Lb is set such that the center portion 72x of the thermo-valve case 72 and the center portion 16Lx of the left support boss portion 16La are located on the extended lines of the reinforcing ribs 16Lb, the coupling rigidity of the reinforcing ribs 16Lb with the left support boss portion 16La and with the thermo-valve case 72 is further increased.

Further, a connecting wall 16Lc is disposed between two of the reinforcing ribs 16Lb for connection therebetween. The connecting wall 16Lc connects between the reinforcing ribs 16Lb while leading from the thermo-valve case 72 to the left support boss portion 16La. In this embodiment, since the connecting wall 16Lc connects between the reinforcing ribs 16Lb while extending from the thermo-valve case 72 to the left support boss portion 16La in the left upper support portion 16L, the rigidity is further increased.

As illustrated in FIG. 6, the thickness of the left upper support portion 16L in the vehicle width direction gradually increases from the left support boss portion 16La toward the rear surface 14b of the cylinder head 14. Therefore, the rigidity at a base portion 16Ld connected to the cylinder head 14 is high.

Further, as illustrated in FIGS. 4, 5, and 6, the bypass connecting pipe ("joint part" in the present invention) 79 through which the bypass cooling water passes is provided on the cylinder head 14 so as to be adjacent to the thermo-valve case 72 at the inner side in the vehicle width direction. An extending direction Y of the left support boss portion 16La of the left upper support portion 16L and an extending direction Z (see FIG. 4) of the bypass connecting pipe 79 are substantially orthogonal to each other in the side view. Since the extending directions X and Y of the left support boss portion 16La and the bypass connecting pipe 79 are substantially orthogonal to each other, the mutual interference with components such as the internal combustion engine fastening member 35 and the bypass pipe 76 to be connected to the left support boss portion 16La and the bypass connecting pipe 79, respectively, is reduced, so that the assembly efficiency is improved.

As mentioned above, the thermo-valve cap ("lid member" in the present invention) 77 is attached to the left-end opening 72a of the thermo-valve case 72. As illustrated in FIG. 4, a female thread portion 72b for fastening and fixing the thermo-valve cap 77 with a cap fastening member ("lid fastening member" in the present invention) 77a is provided at a position of the thermo-valve case 72 displaced from the left upper support portion 16L. As a result, the left support boss portion 16La of the left upper support portion 16L into which the internal combustion engine fastening member 35 is inserted and the female thread portion 72b of the thermo-valve case 72 for fastening the thermo-valve cap 77 are displaced from each other. This prevents the interference between the internal combustion engine fastening member 35 and the cap fastening member 77a, and therefore increases the efficiency of the assembly process.

As illustrated in FIG. 6, the thermo-valve case 72 of this embodiment is disposed at the rear left-end of the cylinder head 14 in the vehicle width direction. At the right end, the cam chain chamber ("transmission mechanism accommodating chamber" in the present invention) 65 that accommodates the cam chain ("driving force transmission mechanism" in the present invention) 64 of the valve gear 6 provided in the cylinder head 14 bulges rearward such that the cylinder head 14 has a bulge portion 14c bulging rearward. The right upper support portion ("another support portion" in the present invention) 16R is provided on the bulge portion 14c.

Hence, the right upper support portion 16R at the opposite side of the thermo-valve case 72 in the vehicle width direction is provided on the bulge portion 14c of the cylinder head 14 that bulges rearward due to the bulge of the cam chain chamber 65, while the left upper support portion ("support portion" in the present invention) 16L is also provided on a rear portion of the cylinder head 14 so as to be aligned with the position of the thermo-valve case 72. Therefore, the left upper support portion 16L and the right upper support portion 16R opposing each other in the vehicle width direction on the cylinder head 14 can be formed to have substantially the same length and shape. This makes it possible to support the internal combustion engine 1 in a balanced manner while balancing the rigidity of each of the left support boss portion 16La of the left upper support portion 16L and a right support boss portion ("another support boss portion" in the present invention) 16Ra of the right upper support portion 16R.

Although an embodiment of the present invention has been described above, it is to be understood that the present invention is not limited to the above-described embodiment and may include various embodiments within the scope of the invention as defined by the appended claims.

For example, the water-cooled internal combustion engine may be any water-cooled internal combustion engine as long as the internal combustion engine has the configuration recited in claim 1. The internal combustion engine is not limited to a two-cylinder engine, and the form, pipe arrangement, and structure of the water-cooling device is not limited to those described in the above embodiment. The water jacket may be provided at least in the cylinder head. In this case, a downstream end of the pump discharge pipe extending from the water pump is connected to the cylinder head.

Further, the vehicle is not limited to the motorcycle of this embodiment, and may include any vehicle, including three and four-wheeled small vehicles such as a buggy, in which a water-cooled internal combustion engine is supported by a body frame.

REFERENCE NUMBERS AND SYMBOLS LIST

1 . . . Internal combustion engine ("water-cooled internal combustion engine" in the present invention)
2 . . . Motorcycle ("vehicle" in the present invention)
10 . . . Crankcase
13 . . . Cylinder
14 . . . Cylinder head
14a . . . Rear left surface
14b . . . Rear surface
14c . . . Bulge portion
16L . . . Left upper support portion ("support portion" in the present invention)
16La . . . Left support boss portion ("support boss portion" in the present invention)
16Lb . . . Reinforcing rib
16Lc . . . Connecting wall
16Ld . . . Base portion
16Lx . . . Center portion
16R . . . Right upper support portion ("second support portion" in the present invention)
16Ra . . . Right support boss portion ("second support boss portion" in the present invention)
20 . . . Body frame
22 . . . Main frame
31L . . . Left upper support bracket
35 . . . Internal combustion engine fastening member
62I . . . Driven cam chain sprocket
62E . . . Driven cam chain sprocket
64 . . . Cam chain ("driving force transmission mechanism" in the present invention)
65 . . . Cam chain chamber ("transmission mechanism accommodating chamber" in the present invention)
70 . . . Water pump
72 . . . Thermo-valve case
72a . . . Left-end opening
72b . . . Female thread portion
72x . . . Center portion
73 . . . Thermo-valve
76 . . . Bypass pipe
77 . . . Thermo-valve cap ("lid member" in the present invention)
77a . . . Cap fastening member ("lid fastening member" in the present invention)
79 . . . Bypass connecting pipe ("joint part" in the present invention)
X . . . Cylinder axis
Y . . . Extending direction (of left support boss portion)
Z . . . Extending direction (of bypass connecting pipe)

We claim:

1. A support structure for a water-cooled internal combustion engine, the water-cooled internal combustion engine being configured to be supported by a body frame of a vehicle, the support structure comprising:
   a cooling device that circulates cooling water through an inside and an outside of at least a cylinder head of the water-cooled internal combustion engine;
   a thermo-valve that controls the cooling water circulating in the cooling device; and
   a thermo-valve case that accommodates the thermo-valve and that is integrally molded with the cylinder head such that a part thereof bulges from a side surface of the cylinder head,
   wherein a support portion formed on the cylinder head is fixed to the body frame and is integrally molded so as to extend between the cylinder head and the thermo-valve case.

2. The support structure for a water-cooled internal combustion engine according to claim 1, wherein a female thread portion for fixing a lid member of the thermo-valve case with a lid fastening member is provided at a position of the thermo-valve case displaced from the support portion.

3. The support structure for a water-cooled internal combustion engine according to claim 1, wherein the thermo-valve case is disposed at a side end of the cylinder head in the vehicle width direction while a transmission mechanism accommodating chamber that accommodates a driving force transmission mechanism of the valve gear provided in the cylinder head protrudes from the cylinder head at another side end thereof so as to form a bulge portion; and wherein another support portion is provided on the bulge portion.

4. The support structure for a water-cooled internal combustion engine according to claim 3, wherein the support portion and the other support portion are disposed on opposite sides of the cylinder head and have substantially the same length and shape.

5. The support structure for a water-cooled internal combustion engine according to claim 1, wherein the support portion includes a support boss portion configured to receive an internal combustion engine fastening member for fastening to the body frame; and wherein a plurality of reinforcing ribs are formed so as to radially extend from the support boss portion toward the thermo-valve case and the cylinder head.

6. The support structure for a water-cooled internal combustion engine according to claim 5, wherein the support portion includes a connecting wall that connects between two of the reinforcing ribs, the connecting wall connecting between the reinforcing ribs while extending from the thermo-valve case to the support boss portion.

7. The support structure for a water-cooled internal combustion engine according to claim 6, wherein a thickness of the support portion in a vehicle width direction gradually increases from the support boss portion toward the cylinder head.

8. The support structure for a water-cooled internal combustion engine according to claim 6, wherein a joint part through which the cooling water passes is provided on the cylinder head so as to be adjacent to the thermo-valve case at an inner side in the vehicle width direction; and wherein an extending direction of the support boss portion of the support portion and an extending direction of the joint part are substantially orthogonal to each other in a side view.

9. The support structure for a water-cooled internal combustion engine according to claim 6, wherein a female thread portion for fixing a lid member of the thermo-valve case with a lid fastening member is provided at a position of the thermo-valve case displaced from the support portion.

10. The support structure for a water-cooled internal combustion engine according to claim 5, wherein a thickness of the support portion in a vehicle width direction gradually increases from the support boss portion toward the cylinder head.

11. The support structure for a water-cooled internal combustion engine according to claim 10, wherein a joint part through which the cooling water passes is provided on the cylinder head so as to be adjacent to the thermo-valve case at an inner side in the vehicle width direction; and wherein an extending direction of the support boss portion of the support portion and an extending direction of the joint part are substantially orthogonal to each other in a side view.

12. The support structure for a water-cooled internal combustion engine according to claim 5, wherein a joint part through which the cooling water passes is provided on the cylinder head so as to be adjacent to the thermo-valve case at an inner side in the vehicle width direction; and wherein an extending direction of the support boss portion of the support portion and an extending direction of the joint part are substantially orthogonal to each other in a side view.

13. The support structure for a water-cooled internal combustion engine according to claim 5, wherein a female thread portion for fixing a lid member of the thermo-valve case with a lid fastening member is provided at a position of the thermo-valve case displaced from the support portion.

14. The support structure for a water-cooled internal combustion engine according to claim 5, wherein the thermo-valve case is disposed at a side end of the cylinder head in the vehicle width direction while a transmission mechanism accommodating chamber that accommodates a driving force transmission mechanism of the valve gear provided in the cylinder head protrudes from the cylinder head at another side end thereof so as to form a bulge portion; and wherein another support portion is provided on the bulge portion.

15. The support structure for a water-cooled internal combustion engine according to claim 5, wherein a width of each of the reinforcing ribs is set such that a center portion of the thermo-valve case and a center portion of the support boss portion are located on extended lines of the reinforcing ribs.

16. The support structure for a water-cooled internal combustion engine according to claim 15, wherein the support portion includes a connecting wall that connects between two of the reinforcing ribs, the connecting wall connecting between the reinforcing ribs while extending from the thermo-valve case to the support boss portion.

17. The support structure for a water-cooled internal combustion engine according to claim 15, wherein a thickness of the support portion in a vehicle width direction gradually increases from the support boss portion toward the cylinder head.

18. The support structure for a water-cooled internal combustion engine according to claim 15, wherein a joint part through which the cooling water passes is provided on the cylinder head so as to be adjacent to the thermo-valve case at an inner side in the vehicle width direction; and wherein an extending direction of the support boss portion of the support portion and an extending direction of the joint part are substantially orthogonal to each other in a side view.

19. The support structure for a water-cooled internal combustion engine according to claim 15, wherein a female thread portion for fixing a lid member of the thermo-valve case with a lid fastening member is provided at a position of the thermo-valve case displaced from the support portion.

* * * * *